(12) United States Patent  
Dachiku

(10) Patent No.: US 8,615,783 B2  
(45) Date of Patent: Dec. 24, 2013

(54) VIDEO SENDING APPARATUS AND CAPTION REPLACING METHOD

(75) Inventor: Kenshi Dachiku, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 13/022,860

(22) Filed: Feb. 8, 2011

(65) Prior Publication Data

US 2011/0221958 A1 Sep. 15, 2011

(30) Foreign Application Priority Data

Mar. 11, 2010 (JP) ................................ 2010-054916

(51) Int. Cl.
*H04N 7/08* (2006.01)
*H04N 7/16* (2011.01)

(52) U.S. Cl.
USPC ............. 725/137; 725/54; 725/136; 725/138; 386/337; 348/468

(58) Field of Classification Search
None
See application file for complete search history.

(56) References Cited

FOREIGN PATENT DOCUMENTS

JP 2006-203384 8/2006

*Primary Examiner* — Joshua Taylor
(74) *Attorney, Agent, or Firm* — Oblon, Spivak, McClelland, Maier & Neustadt, L.L.P.

(57) ABSTRACT

A reception processor converts an MXF file to internal content data pieces, and converts replacement caption data to internal caption data pieces and then stores the internal content data pieces and the internal caption data pieces in a memory. A separator separates a video data piece, an audio data piece and an ANC data piece from the internal content data piece received from the memory. When a caption replacer receives synchronously the internal caption data piece outputted from the memory and the ANC data piece outputted from the separator, the caption replacer replaces a caption data piece included in the ANC data piece with a replacement data piece in the internal caption data piece. Subsequently, the multiplexer multiplexes the video data piece and the audio data piece outputted from the separator, and the ANC data piece outputted from the caption replacer, and thus outputs an SDI signal.

3 Claims, 4 Drawing Sheets

| FRAME NO.1 | FRAME NO.2 | FRAME NO.3 | .... | FRAME NO. n |
|---|---|---|---|---|
| TIME CODE T1 | TIME CODE T2 | TIME CODE T3 | .... | TIME CODE Tn |

FIG. 2

| METADATA | FRAME F1<br>VIDEO DATA<br>AUDIO DATA<br>ANC DATA<br>⎡CAPTION DATA C1<br>⎣TIMECODE T1 | FRAME F2<br>VIDEO DATA<br>AUDIO DATA<br>ANC DATA<br>⎡CAPTION DATA C2<br>⎣TIMECODE T2 | .... | FRAME Fn<br>VIDEO DATA<br>AUDIO DATA<br>ANC DATA<br>⎡CAPTION DATA Cn<br>⎣TIMECODE Tn |
|---|---|---|---|---|

FIG.3

| METADATA | ANC DATA<br>⎡REPLACEMENT<br>⎢DATA C2'<br>⎣TIMECODE T2 | ANC DATA<br>⎡REPLACEMENT<br>⎢DATA C35'<br>⎣TIMECODE T35 | .... | ANC DATA<br>⎡REPLACEMENT<br>⎢DATA C50'<br>⎣TIMECODE T50 |
|---|---|---|---|---|

FIG. 4

VIDEO SENDING APPARATUS AND CAPTION REPLACING METHOD

CROSS-REFERENCE TO RELATED APPLICATION

This application is based upon and claims the benefit of priority from the prior Japanese Patent Application No. 2010-054916, filed on Mar. 11, 2010, the entire contents of which are incorporated herein by reference.

FIELD

The embodiments herein described relate to a video sending apparatus and a caption replacing method, both of which are capable of replacing caption data in content data with other caption data.

BACKGROUND

Broadcasting stations carrying digital broadcasts use an MXF (Material eXchange Format) file in which video data, audio data and ancillary data are multiplexed together. The broadcasting stations have a caption replacement server in order to replace caption data included in the MXF file with other caption data. The caption replacement server is installed between a content server for storing the MXF file and a video sending apparatus for: receiving the MXF file; and outputting SDI (Serial Digital Interface) signals. The caption replacement server receives the MXF file outputted from the content server and replacement caption data, and replaces the caption data included in the MXF file with the replacement caption data. Subsequently, the caption replacement server outputs the MXF file, which now includes the replacement caption data in place of the caption data, to the video sending apparatus.

A conventional configuration causes the caption replacement server to output the MXF file to the video sending apparatus after replacing the caption data with the replacement caption data. As a result, the video sending apparatus cannot start to process the MXF file until the caption replacement server finishes replacing of the caption data. Accordingly, the conventional configuration entails a problem that it takes time from the input of the MXF file until the sending of the SDI signal. In addition, the caption replacement server is needed to replace the caption data with the replacement caption data. The caption replacement server makes the overall system expensive and large in size.

JP, P2006-203384A has proposed a caption sending apparatus capable of handling multiple caption data formats by itself.

BRIEF DESCRIPTION OF THE DRAWINGS

FIG. 2 is a diagram showing an association table in which frame numbers and their corresponding time codes are described;

FIG. 3 is a diagram showing an MXF file outputted from a content server shown in FIG. 1;

FIG. 4 is a diagram showing replacement caption data outputted from a caption editor terminal shown in FIG. 1;

DETAILED DESCRIPTION

Figure 1:
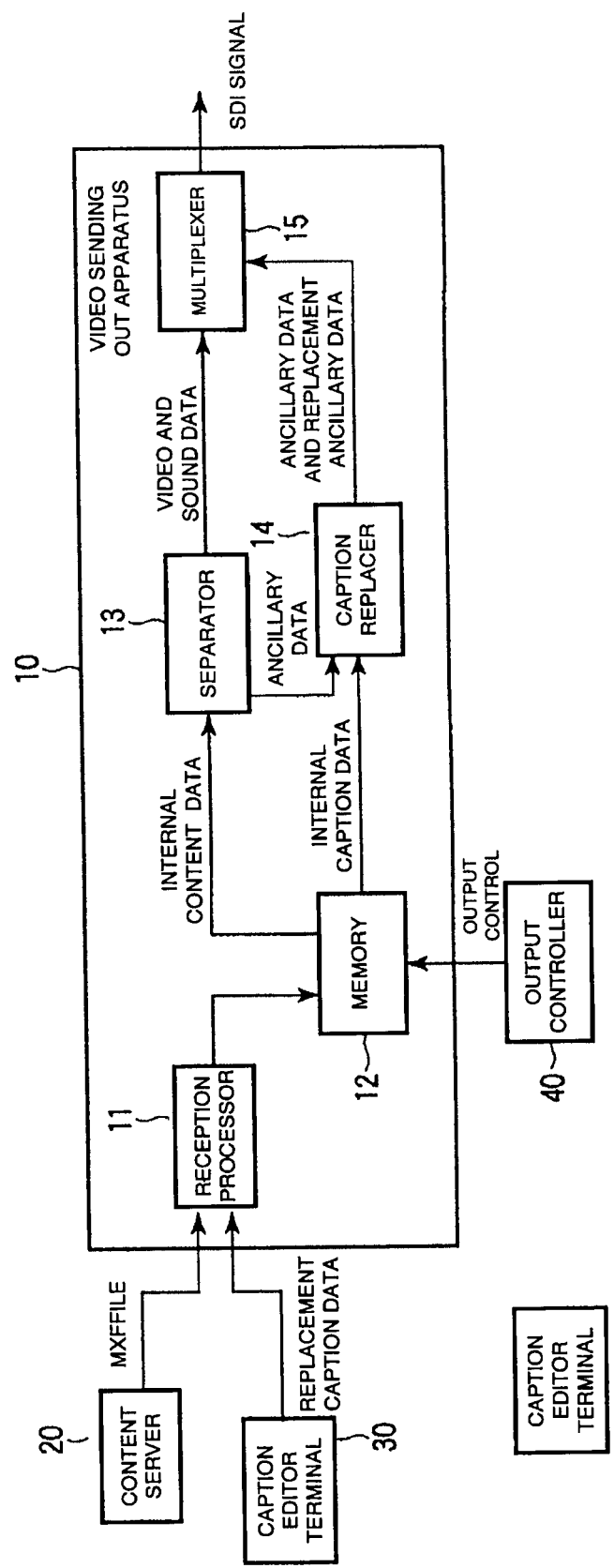
FIG. 1 is a block diagram showing a functional configuration of a video sending apparatus according to an embodiment.

According to one embodiment, a video sending apparatus includes a reception processor, a memory, a separator, a caption replacer, and a multiplexer. The reception processor is configured: to receive MXF (Material eXchange Format) data from the outside, the MXF data including a plurality of frames each including a video data piece, a audio data piece and a first ancillary data piece; to divide the received MXF data into data pieces per preset number of frames; to generate internal content data pieces by adding identifiers to the divided MXF data; to output the generated internal content data pieces; to receive replacement caption data from the outside, the replacement caption data including second ancillary data pieces which respectively include replacement data pieces; to divide the received replacement caption data into data pieces per the secondary ancillary data piece; to generate internal caption data pieces by adding an identifier to each of the replacement data pieces, the identifier being identical to the identifier added to the internal content data piece including the frame corresponding to the replacement data piece; and to output the generated internal caption data pieces. The memory is configured: to receive and store the internal content data pieces and the internal caption data pieces which are outputted from the reception processor; and to synchronously output one of the internal content data pieces and one of the internal caption data pieces which are provided with the same identifier, on a basis of output control. The separator is configured: to receive the internal content data piece outputted from the memory; to separate the video data piece, the audio data piece and the first ancillary data piece from the internal content data piece; and to output the video data piece, the audio data piece and the first ancillary data piece. The caption replacer is configured: to, when almost synchronously receiving the first ancillary data piece outputted from the separator and the internal caption data piece outputted from the memory, replace a caption data piece included in the first ancillary data piece with the replacement data piece in the internal caption data piece, to generate a replacement ancillary data piece, and to output the replacement ancillary data piece; and to, when receiving only the first ancillary data piece outputted from the separator, output the first ancillary data piece. The multiplexer is configured to multiplex together the video data piece and the audio data piece outputted from the separator, and any one of the replacement ancillary data piece and the first ancillary data piece which are outputted from the caption replacer.

According to one embodiment, a caption replacing method includes the steps of: (A) receiving MXF (Material eXchange Format) data from the outside, the MXF data including a plurality of frames each including a video data piece, an audio data piece and a first ancillary data piece; (B) dividing the received MXF data into data pieces per preset number of frames; (C) generating internal content data pieces by adding identifiers to the divided MXF data; (D) recording the generated internal content data pieces in a memory; (E) receiving replacement caption data from the outside, the replacement caption data including second ancillary data pieces which respectively include caption data pieces; (F) dividing the received replacement caption data into data pieces per the secondary ancillary data piece; (G) comparing each of the replacement data pieces with the frames, and in a case where the replacement data piece corresponds to any one of the frames, generating an internal caption data piece by adding an identifier to the replacement data piece, the identifier being identical to the identifier added to an internal content data piece including the frame; (H) recording the internal caption data piece in the memory; (I) outputting each of the internal content data pieces from the memory, and outputting one of the internal caption data pieces provided with an identifier identical to the identifier of the internal content data pieces, from the memory in synchronism with the internal content data piece; (J) separating the video data piece, the audio data piece and the first ancillary data piece from the internal content data piece outputted from the memory; (K) when synchronously receiving the separated first ancillary data piece and the internal caption data piece outputted from the memory, generating a replacement ancillary data piece by replacing the caption data piece included in the first ancillary data piece with the replacement data piece in the internal caption data piece, and outputting the replacement ancillary data piece; (L) multiplexing the separated video data piece, the separated audio data piece and the replacement ancillary data piece together.

Referring to the drawings, detailed descriptions will be provided for a video sending apparatus according to the embodiment.

FIG. 1 is a block diagram showing a functional configuration of a video sending apparatus 10 according to the embodiment. FIG. 2 shows an example of an association table. The video sending apparatus 10 is connected to a content server 20, a caption editor terminal 30 and an output controller 40.

The content server 20 stores content data as an MXF file compliant with the MXF. The content server 20 outputs the MXF file to the video sending apparatus 10. The MXF file includes metadata and multiple frames of real data. The metadata includes various kinds of management data needed to manage the file. The management data includes the number of frames of real data, for example.

A video data piece, an audio data piece and an ANC (ancillary) data piece are multiplexed together in each frame of real data. In this respect, if a certain frame includes caption data, the ANC data piece in the frame includes the caption data, a time code indicating a length of time from the first frame, and the like. Incidentally, the time code may be included in the metadata instead of in the ANC data piece.

On the basis of the user's manipulation, the caption editor terminal 30 creates replacement data with which to replace the caption data included in the content. As replacement caption data, the replacement data is outputted to the video sending apparatus 10 by the caption editor terminal 30. In this respect, the caption editor terminal 30 may convert the replacement data into an MXF file and output the MXF file, or may output the replacement data as the ANC data pieces.

In the case where the replacement data is outputted as the MXF file, the MXF file includes metadata and ANC data pieces. Each ANC data piece includes a replacement data piece and a time code for replacing a corresponding caption data piece included in the content with this replacement data piece. Incidentally, the time code may be included in the metadata instead of in the ANC data piece. In a case where the replacement data is outputted in the ANC data pieces, each ANC data piece includes the replacement data piece and a time code for replacing the corresponding caption data piece included in the content with this replacement data piece.

The output controller 40 gives the output control to the video sending apparatus 10 on the base of time and the like in the broadcasting station.

The video sending apparatus 10 includes a reception processor 11, a memory 12, a separator 13, a caption replacer 14 and a multiplexer 15.

The reception processor 11 receives at different timings the MXF file outputted from the content server 20 and the replacement caption data outputted from the caption editor terminal 30, and performs reception processes on the MXF file and the replacement caption data. To put it specifically, the reception processor 11 receives the MXF file outputted from the content server 20, and divides the MXF file into data pieces per frame referring to metadata included in the MXF file. Subsequently, the reception processor 11 respectively adds headers, in which frame numbers are described, to the divided data pieces of the frame. In other words, the reception processor 11 adds identifiers respectively to the divided data pieces. A data piece of each frame added with a header will be hereinafter referred to as an internal content data piece. The reception processor 11 outputs all the internal content data pieces to the memory 12. Furthermore, the reception processor 11 makes the association table 50 in which the frame number, namely, the identifier are associated with the time code of the caption data piece. In a case where the frame includes the caption data piece, the reception processor 11 adds the frame number and the time code in the association table 50.

Furthermore, the reception processor 11 divides the received replacement caption data into pieces corresponding to the respective ANC data pieces. Referring to the association table 50, the reception processor 11 compares the time code of the replacement data piece, which is included in each divided ANC data piece, with the time codes in the MXF file. If the time code of the replacement data piece is identical to the time code of any one of the frames of real data in the MXF file, the reception processor 11 adds a header in which the frame number is described to the replacement data piece. In other words, the reception processor 11 adds a predetermined identifier to every replacement data piece. In this respect, this frame number is identical to the frame number described in a header of an internal content data piece which includes a frame having the identical time code. Each replacement data piece provided with a header will be hereinafter referred to as an internal caption data piece. Thereby, each internal caption data piece is associated with an internal content data piece which includes the caption data piece to be replaced. Subsequently, the reception processor 11 outputs all the internal caption data pieces to the memory 12.

The memory 12 stores all the internal content data pieces and the internal caption data pieces which are outputted from the reception processor 11.

On the basis of the output control outputted from the output controller 40, the memory 12 outputs the stored internal content data pieces to the separator 13. In this respect, if there exists an internal caption data piece whose frame number described in the header is identical to the frame number described in the header of the internal content data piece to be outputted, the memory 12 outputs the internal caption data piece to the caption replacer 14 in synchronism with the output of the internal content data piece. In other words, if there exists an internal caption data piece having the identifier identical to the identifier of the internal content data piece to be outputted, the memory 12 outputs the internal caption data piece to the caption replacer 14 in synchronism with the output of the internal content data piece. It should be noted that, if there exists no internal caption data piece whose frame number described in the header is identical to the frame number described in the header of the internal content data piece to be outputted, the memory 12 outputs only the internal content data pieces to the separator 13.

The separator 13 separates the video data piece, the audio data piece and the ANC data piece from each internal content data piece. Subsequently, the separator 13 outputs the video data piece and the audio data piece to the multiplexer 15, and the ANC data piece to the caption replacer 14.

In a case where the caption replacer 14 receives the internal caption data piece and the ANC data piece almost simultaneously, that is to say, within a period of time for the same frame, the caption replacer 14 replaces the caption data piece in the ANC data piece with the replacement data piece in the internal caption data piece. The caption replacer 14 outputs a replacement ANC data piece, which is obtained by replacing the caption data piece with the replacement data piece, to the multiplexer 15.

In a case where the caption replacer 14 receives only the ANC data piece, that is to say, the caption replacer 14 does not receive the internal caption data piece and the ANC data piece almost simultaneously, the caption replacer 14 outputs the ANC data piece to the multiplexer 15 without any change.

The multiplexer 15 generates an SDI signal by multiplexing the video data piece and the audio data piece outputted from the separator 13 with the ANC data piece or the replacement ANC data piece outputted from the caption replacer 14, and outputs the SDI signal.

Next, detailed descriptions will be provided for how the video sending apparatus 10 configured in the above-described manner carries out the caption replacement operation.

FIGS. 2 to 6 are schematic diagrams showing examples of data to be processed by the video sending apparatus 10 of the embodiment.

FIG. 3 is a schematic diagram showing an MXF file 60 outputted from the content server 20. The MXF file 60 includes metadata and frames F1 to Fn of real data. In each frame F1 to Fn, a video data piece, an audio data piece and an ANC data piece are multiplexed together. ANC data pieces include caption data pieces C1 to Cn and time codes T1 to Tn, respectively.

FIG. 4 is a schematic diagram showing the replacement caption data outputted from the caption editor terminal 30. The caption editor terminal 30 outputs the replacement caption data as an MXF file 65. The MXF file 65 includes metadata and ANC data pieces. The ANC data pieces include: replacement data pieces C2', C35', C50' and the like; and time codes T2, T35, T50 and the like, respectively.

Figure 5:
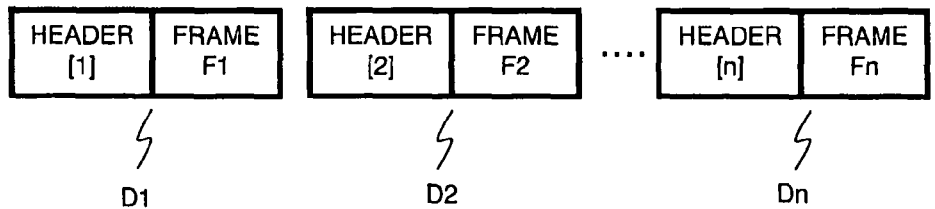
FIG. 5 is a diagram showing internal content data pieces stored in a memory shown in FIG. 1.

The reception processor 11 divides the MXF file 60 outputted from the content server 20 into data pieces per frame, and converts the data pieces to internal content data pieces D1 to Dn as shown in FIG. 5. At this time, a header in which a frame number "1" is described is added to a frame F1, and thereby the frame F1 is converted to the internal content data piece D1. A header in which a frame number "2" is described is added to a frame F2, and thereby the frame F2 is converted to the internal content data piece D2. Similarly, a header in which a frame number "n" is described is added to a frame Fn, and thereby the frame Fn is converted to the internal content data piece Dn. In other words, the reception processor 11 divides the MXF file 60 into data pieces per frame, and adds the identifiers to the respective data pieces each is a frame, and thereby the respective data pieces are converted to the internal content data pieces D1 to Dn. It should be noted that the reception processor 11 outputs the internal content data pieces to the memory 12. The reception processor 11 makes the association table 50 as mentioned above. In addition, if a frame(s) includes a caption data piece(s), the reception processor 11 adds the frame number and the time code in the association table 50.

Figure 6:
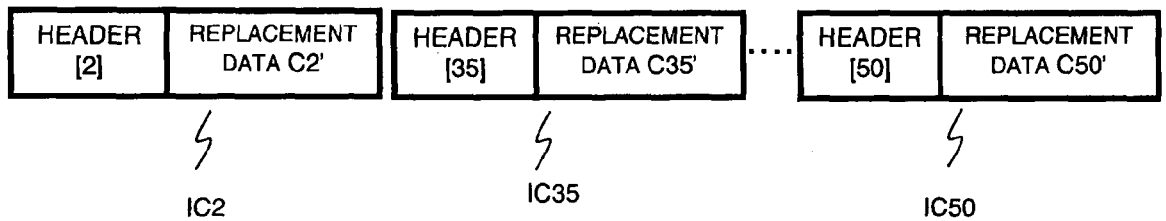
FIG. 6 is a diagram showing internal caption data pieces stored in the memory shown in FIG. 1.

In addition, the reception processor 11 divides the MXF file 65 of the replacement caption data outputted from the caption editor terminal 30 into data pieces per the ANC data piece, and converts the data pieces to the respective internal caption data pieces IC2, IC35, IC50 and the like as shown in FIG. 6. At this time, referring to the association table 50, the reception processor 11 compares the time codes included in the respective ANC data pieces in the MXF file 65 with the time codes T1 to Tn of the frames F1 to Fn in the MXF file 60. Because the time code T2 included in an ANC data piece in the MXF file 65 is identical to the time code T2 of the frame F2, for example, the reception processor 11 adds a header in which the frame number "2" is described to the replacement data piece C2'. Thereby, the reception processor 11 generates the internal caption data piece IC2. The reception processor 11 outputs the internal caption data piece IC2 to the memory 12. As in the case of the ANC data piece, the reception processor 11 generates an internal caption data piece for the next ANC data piece, and outputs the internal caption data piece to the memory 12.

The memory 12 stores: the internal content data pieces D1 to Dn; and the internal caption data pieces IC2, IC35, CI50 and the like. In accordance with the output control outputted from the output controller 40, the memory 12 sequentially outputs the internal content data pieces D1 to Dn to the separator 13. At this time, the memory 12 outputs the internal caption data piece IC2 in whose header the frame number "2" is described to the caption replacer 14 in synchronism with the output of the internal content data piece D2. In other words, the memory 12 synchronously outputs the internal content data piece D2 and the internal caption data piece IC2 which are both provided with the same identifier. On this occasion, the memory 12 outputs the internal content data piece D2 to the separator 13, and the internal caption data piece IC2 to the caption replacer 14.

The separator 13 separates the video data pieces, the audio data pieces and the ANC data pieces from the internal content data pieces D1 to Dn outputted from the memory 12, respectively. Subsequently, the separator 13 outputs the video data pieces and the audio data pieces to the multiplexer 15, and the ANC data pieces to the caption replacer 14.

The caption replacer 14 receives the ANC data piece in the internal content data piece D1 from the separator 13. The caption replacer 14 receives no internal caption data piece because there is no internal caption data piece which corresponds to the internal content data piece D1. Accordingly, the caption replacer 14 outputs the received ANC data piece to the multiplexer 15 without any change. Subsequently, the caption replacer 14 receives the ANC data piece in the internal content data piece D2 outputted from the separator 13 and the internal caption data piece IC2 corresponding to the internal content data piece D2 outputted from the memory 12 almost simultaneously. The caption replacer 14 replaces the caption data piece included in the ANC data piece in the internal content data piece D2 with the replacement data piece in the internal caption data piece IC2. The caption replacer 14 outputs a replacement ANC data piece, in which the caption data piece is replaced with the replacement data piece, to the multiplexer 15. If there is the ANC data piece corresponding to no internal caption data piece like the ANC data piece in the internal content data piece D1, the caption replacer 14 receives only the ANC data piece in the internal content data piece outputted from the separator 13, and outputs the received ANC data piece to the multiplexer 15 without any change.

The multiplexer 15 generates an SDI signal by multiplexing the video data piece and the audio data piece outputted from the separator 13 with the ANC data piece or the replacement ANC data piece outputted from the caption replacer 14. Subsequently, the multiplexer 15 outputs the SDI signal.

As described above, in the foregoing embodiment, the reception processor 11 converts the MXF file to the internal content data pieces, outputs the internal content data pieces, and stores the internal content data pieces in the memory 12. In addition, the reception processor 11 converts the replacement caption data to the internal caption data pieces, and outputs the internal caption data pieces. When converting the replacement caption data to the internal caption data pieces, the reception processor 11 associates the replacement data pieces with the internal content data pieces, and subsequently stores the internal content data pieces in the memory 12. The memory 12 outputs the internal content data pieces to the separator. In addition, the memory 12 outputs the internal caption data pieces, which are associated with the internal content data pieces, to the caption replacer 14 in synchronism with the output of the internal content data pieces. In a case where the caption replacer 14 is supplied with an ANC data piece in an internal content data piece outputted from the separator 13 and an internal caption data piece outputted from the memory 12 almost simultaneously, the caption replacer 14 replaces the caption data piece included in the ANC data piece with the replacement data piece in the internal caption data piece, and thereby generates a replacement ANC data piece. The caption replacer 14 outputs the replacement ANC data piece to the multiplexer 15. Subsequently, the multiplexer 15 generates an SDI signal by multiplexing the video data piece and the audio data piece outputted from the separator 13 with the replacement ANC data piece outputted from the caption replacer 14. Thereafter, the multiplexer 15 outputs the SDI signal. By this, the video sending apparatus 10 is capable of replacing the caption data piece with the corresponding the replacement data piece.

Accordingly, the video sending apparatus 10 of the present embodiment is capable of replacing the caption data in the MXF file with the replacement data on its own. Thereby, the replacement of the caption data with the replacement data is simultaneous with the conversion of the MXF file, which is outputted from the content server 20, to an SDI signal. For this reason, the video sending apparatus 10 is capable of reducing the time needed to transmit the SDI signal whose caption data has been replaced with the replacement data after receiving the MXF file. In addition, the video sending apparatus 10 makes the conventionally-necessary caption server unnecessary, and makes it possible to reduce the costs and space of the system in broadcasting stations.

Figure 7:
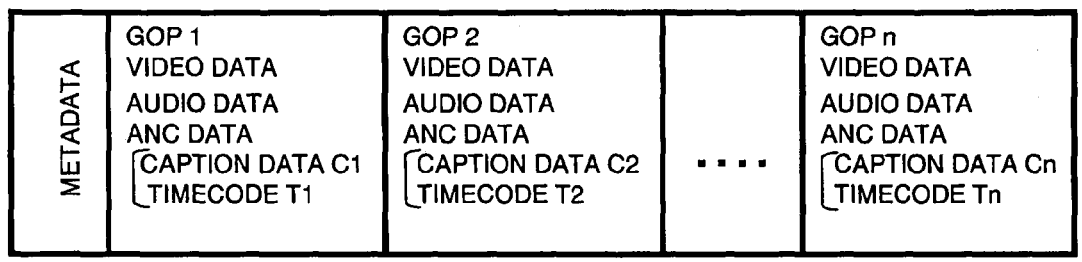
FIG. 7 is a diagram showing another example of the MXF file outputted from the content server.
Figure 8:
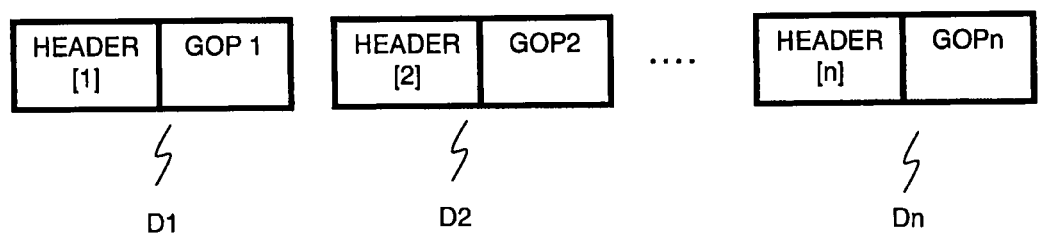
FIG. 8 is diagram showing another example of internal content data pieces stored in the memory.

It should be noted that the present invention is not limited to the foregoing embodiment. In the above-described embodiment, the reception processor 11 is configured to divide the MXF file outputted from the content server 20 into the data pieces per frame, and adds the headers, in which the frame numbers are described, to the divided data pieces, respectively. Instead, however, the reception processor 11 may be configured to divide the MXF file outputted from the content server 20 into data pieces per multiple frames, for example, each data piece consisting of 15 frames which constitute one GOP (Group of Picture). In this case, as shown in FIGS. 7 and 8, the reception processor 11 may be configured to divide an MXF file 70 outputted from the content server 20 into data pieces per GOP, and to add headers, in which GOP numbers are described, to the divided data pieces, respectively. In addition, as in the case of the foregoing embodiment, the reception processor 11 is configured to create an association table in which the GOP numbers are respectively associated with the time codes. In this modification, the headers are added to the data pieces obtained by dividing the data per GOP, and the headers and data pieces are referred to as internal content data pieces D1, D2 to Dn, respectively.

Subsequently, the reception processor 11 compares the time code of the replacement data piece with the time codes of the caption data pieces in the multiple frames in the MXF file. If the time code of the replacement data piece is identical to the time code of the caption data piece in any one of the internal content data pieces in the MXF file, the reception processor 11 adds a header, in which a predetermined GOP number is described, to the replacement data piece. In this respect, this GOP number is identical to the GOP number which is described in a header of an internal content data piece which includes a frame having the identical time code. Thereby, each internal caption data piece is associated with an internal content data piece having a corresponding the caption data piece to be replaced.

Moreover, the video sending apparatus 10 according to the present embodiment may include a decoder between the separator 13 and the multiplexer 15. In this case, when MPEG2 compliant video and audio data is outputted from the separator 13, the data can be decoded by the decoder and then supplied to the multiplexer 15.

The present invention can provide a video sending apparatus and a caption replacing method, both of which are capable of replacing caption data in an MXF file with replacement data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A caption replacing method comprising the steps of:
(A) receiving MXF (Material eXchange Format) data, the MXF data including a plurality of frames each including a video data piece, an audio data piece and a first ancillary data piece;
(B) dividing the received MXF data into data pieces per preset number of frames;
(C) generating internal content data pieces by adding identifiers to the divided MXF data;
(D) recording the generated internal content data pieces in a memory;
(E) receiving replacement caption data from the outside, the replacement caption data including second ancillary data pieces which respectively include caption data pieces;
(F) dividing the received replacement caption data into data pieces per the secondary ancillary data piece;
(G) comparing each of the replacement data pieces with the frames, and in a case where the replacement data piece corresponds to any one of the frames, generating an internal caption data piece by adding an identifier to the replacement data piece, the identifier being identical to the identifier added to an internal content data piece including the frame, (H) recording the internal caption data piece in the memory, (I) outputting each of the internal content data pieces from the memory, and outputting one of the internal caption data pieces provided with an identifier identical to the identifier of the internal content data pieces, from the memory in synchronism with the internal content data piece, (J) separating the video data piece, the audio data piece and the first ancillary data piece from the internal content data piece outputted from the memory, (K) when synchronously receiving the separated first ancillary data piece and the internal caption data piece outputted from the memory, generating a replacement ancillary data piece by replacing the caption data piece included in the first ancillary data piece with the replacement data piece in the internal caption data piece, and outputting the replacement ancillary data piece, (L) multiplexing the separated video data piece, the separated audio data piece and the replacement ancillary data piece together.

2. The caption replacing method according to claim 1, further comprising the step of when receiving only the separated first ancillary data piece but not receiving any internal caption data piece from the memory in synchronism with the first ancillary data piece, outputting the first ancillary data piece without any change, wherein the step (L) is a step of multiplexing together the separated video data piece and the separated audio data piece, and any one of the replacement ancillary data piece and the first ancillary data piece.

3. The caption replacing method according to claim 2, wherein the first ancillary data piece in each frame includes a time code of the caption data piece, each second ancillary data piece includes a time code of the replacement data piece, and in the step (G), the time code of the caption data piece and the time code of the replacement data piece are compared, and if the time codes are identical, it is judged that the replacement data piece corresponds to the frame.

* * * * *